C. B. MACLAY.
METHOD OF CHECK-ROWING CORN.
No. 183,314. Patented Oct. 17, 1876.
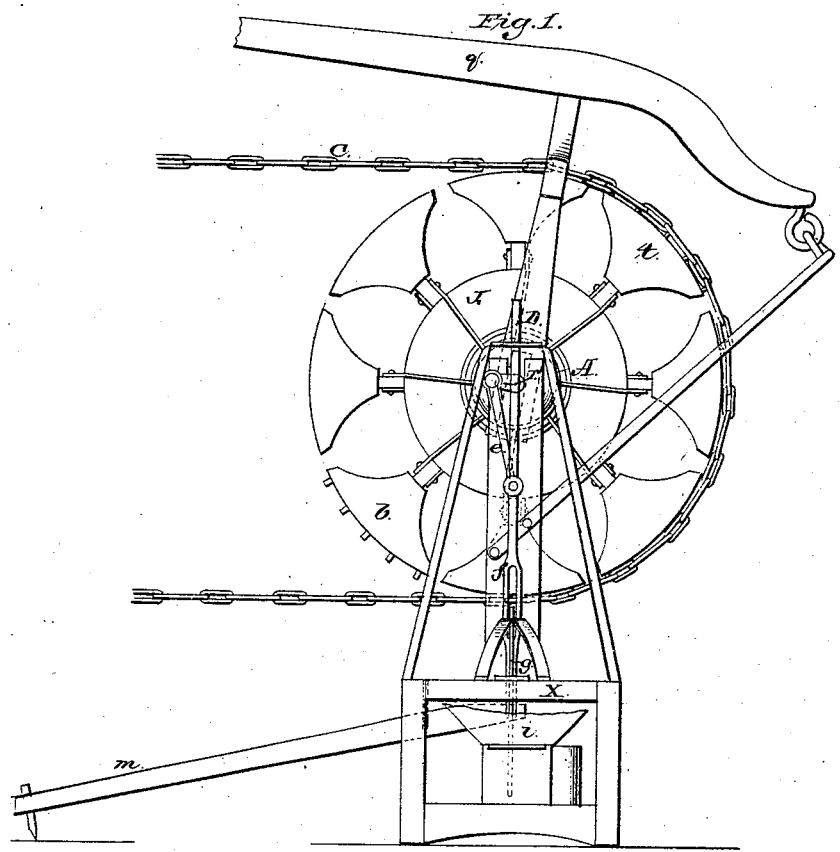
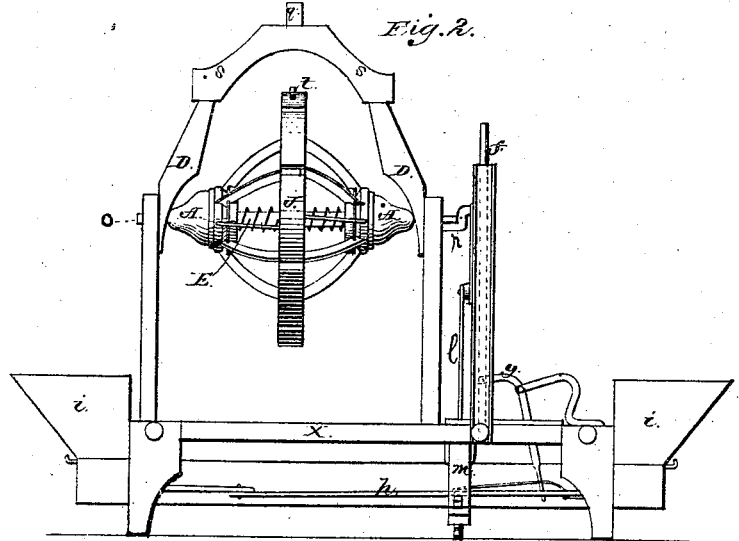
Attest:
Wm. C. Haines.
Chas. L. Booth.
Inventor:
Charles B. Maclay.

UNITED STATES PATENT OFFICE.

CHARLES B. MACLAY, OF DELAVAN, ILLINOIS.

IMPROVEMENT IN METHODS OF CHECKROWING CORN.

Specification forming part of Letters Patent No. 183,314, dated October 17, 1876; application filed April 27, 1876.

*To all whom it may concern:*

Be it known that I, CHARLES B. MACLAY, a citizen of the United States of America, and resident at Delavan, Tazewell county, Illinois, have invented a new Machine for Planting and Checkrowing Corn; and I do hereby declare the following to be a full and exact description of the same, reference being had to the annexed drawings, making part of this specification, in which—

Figure 1 is a side elevation of the machine as ready for attachment to any two-horse corn-planter now in use. Fig. 2 is a back view of the adjustable wheel and its connections.

The operation of the machine is as follows: Having been secured to any two-horse planter in proper position and on a suitable platform, or by iron braces, as most desirable, the adjustable wheel J, Fig. 1, being connected by a uniform link-chain, C, with a common toothed and ratcheted wheel on the collar of the corn-planter wheel, (not shown in the figure nor claimed as my invention,) the rolling of the corn-planter wheel communicates positive motion to the chain C, operating the adjustable wheel J, two opposite arms of which are toothed on their faces to receive the uniform links, as at $t$ and $b$, giving rotation to the crank $r$, operating the bar $e$, reciprocating the slotted perpendicular arm $f$, vibrating the angle $g$ and slide $h$, Fig. 2, through whose perforated ends the corn is dropped from the hopper $i$. Two only of the arms of the adjustable wheel are toothed, for the reason that the wheel may thus be expanded when only one arm is engaged with the chain C.

Now, as the convexity of the ground passed over will modify the distance from hill to hill, and these spaces be marked by the drag $m$, Fig. 1, skipping over alternate hills, being pressed by the arm $f$, Fig. 2, thus showing where the corn lies, and indicating whether laid in checkrow or not, the gain or loss may be noted and corrected by seizing the lever $q$, Fig. 1, and forcing the wedges D D, Fig. 2, against the hubs A A, sliding them inward on the axle E against the tension of the spiral springs, thus enlarging the wheel J and delaying the drop, or vice versa. Now, since the undulations of the ground rarely exceed six degrees in the field, I find that one-eighth of an inch is the limit of variation between hills of corn, so that the error need be corrected only once in a hundred yards, and frequently but once in two or four times the distance. This is then easily done by the use of the lever $q$, Fig. 1, enlarging or reducing the diameter of wheel J; but in fields nearly level, the loss and gain is extremely small, and the wheel J may be securely fixed, and the lever $q$ and its parts removed. Then should an error occur, it can be corrected by setting the wheel J backward or forward at will by means of a ratchet on the drive-wheel or on the wheel J, which I reserve the right to arrange at pleasure.

I also do not restrict myself to the use of the drag $m$, Fig. 1, since it may be dispensed with, and the bar $l$, Fig. 2, elongated to penetrate the ground at each alternate drop, and thus designate alternate hills of corn.

What I claim as new, and desire to secure by Letters Patent, is—

1. The combination of an adjustable wheel, J, crank $r$, bar $e$, perpendicular arm $f$, bent lever $q$, and slide $h$, substantially as and for the purpose set forth.

2. The combination of the chain C, Fig. 1, adjustable wheel J, crank $r$, and a marking-bar, substantially as shown and described, to operate in connection with a planter, as specified.

CHARLES B. MACLAY.

Witnesses:
E. O. JONES,
W. C. HAINES,
C. L. BOOTH.